(12) United States Patent
Li et al.

(10) Patent No.: US 10,031,600 B2
(45) Date of Patent: Jul. 24, 2018

(54) ARRAY SUBSTRATE, TOUCH PANEL AND DISPLAY DEVICE

(71) Applicants: BOE TECHNOLOGY GROUP CO., LTD., Beijing (CN); HEFEI BOE OPTOELECTRONICS TECHNOLOGY CO., LTD., Hefei, Anhui (CN)

(72) Inventors: Ji Li, Beijing (CN); Zhaozhe Xu, Beijing (CN)

(73) Assignees: BOE TECHNOLOGY GROUP CO., LTD., Beijing (CN); HEFEI BOE OPTOELECTRONICS TECHNOLOGY CO., LTD., Hefei, Anhui (CN)

( * ) Notice: Subject to any disclaimer, the term of this patent is extended or adjusted under 35 U.S.C. 154(b) by 73 days.

(21) Appl. No.: 15/227,143

(22) Filed: Aug. 3, 2016

(65) Prior Publication Data

US 2017/0269743 A1    Sep. 21, 2017

(30) Foreign Application Priority Data

Mar. 16, 2016  (CN) .......................... 2016 1 0151541

(51) Int. Cl.
*G06F 3/041* (2006.01)
*G02F 1/1335* (2006.01)
(Continued)

(52) U.S. Cl.
CPC .......... *G06F 3/0412* (2013.01); *G02F 1/1362* (2013.01); *G02F 1/13338* (2013.01);
(Continued)

(58) Field of Classification Search
CPC .......... G02F 1/13338; G02F 1/133514; G02F 1/133528; G02F 1/13439; G02F 1/1362; G06F 3/0412; G06F 3/044
See application file for complete search history.

(56) References Cited

U.S. PATENT DOCUMENTS

2013/0016065 A1*  1/2013  Reynolds .............. G06F 3/0412
                                                        345/174
2014/0125626 A1*  5/2014  Yang .................. G02F 1/134336
                                                        345/174
(Continued)

FOREIGN PATENT DOCUMENTS

CN        102955637 A     3/2013
CN        103488332 A     1/2014
(Continued)

OTHER PUBLICATIONS

First Office Action dated Dec. 19, 2017 corresponding to Chinese application No. 201610151541.3.

*Primary Examiner* — Hong Zhou
(74) *Attorney, Agent, or Firm* — Nath, Goldberg & Meyer; Joshua B. Goldberg

(57) ABSTRACT

An embodiment of the present invention provides an array substrate, comprising a plurality of pixel units arranged in a matrix manner and a plurality of strip-shaped touch electrodes arranged between adjacent rows of pixel units, respectively, each touch electrode being connected with a corresponding one of a plurality of touch signal lines, at least part of the plurality of touch signal lines being arranged between adjacent columns of pixel units, respectively. Embodiments of the present invention also provide a touch panel comprising the array substrate and a display device comprising the touch panel.

16 Claims, 4 Drawing Sheets

(51) Int. Cl.
*G02F 1/1343* (2006.01)
*G02F 1/1362* (2006.01)
*G02F 1/1333* (2006.01)

(52) U.S. Cl.
CPC .... *G02F 1/13439* (2013.01); *G02F 1/133514* (2013.01); *G02F 1/133528* (2013.01)

(56) References Cited

U.S. PATENT DOCUMENTS

| | | | | |
|---|---|---|---|---|
| 2014/0138717 A1* | 5/2014 | Kong | ................ | G02F 1/133555 257/88 |
| 2014/0146246 A1* | 5/2014 | Ma | ................ | G06F 3/0412 349/12 |
| 2014/0362042 A1* | 12/2014 | Noguchi | ................ | G06F 3/0412 345/174 |
| 2015/0002462 A1* | 1/2015 | Zhao | ................ | G06F 3/044 345/174 |
| 2015/0035791 A1* | 2/2015 | Mo | ................ | G09G 3/3648 345/174 |
| 2016/0004346 A1* | 1/2016 | Zhao | ................ | G06F 3/0412 345/174 |
| 2016/0011687 A1* | 1/2016 | Ding | ................ | G06F 3/044 345/174 |
| 2016/0103547 A1* | 4/2016 | Lu | ................ | G06F 3/0416 345/174 |
| 2016/0187696 A1* | 6/2016 | Kim | ................ | G02F 1/13338 349/12 |
| 2016/0195984 A1* | 7/2016 | Bok | ................ | G06F 3/0412 345/173 |

FOREIGN PATENT DOCUMENTS

| | | | |
|---|---|---|---|
| CN | 103995617 A | 8/2014 | |
| CN | 104330935 A | 2/2015 | |
| CN | 104765502 A | 7/2015 | |
| WO | WO 2015032139 A1 * | 3/2015 | ............ G06F 3/044 |

* cited by examiner

--PIROR ART--

ARRAY SUBSTRATE, TOUCH PANEL AND DISPLAY DEVICE

CROSS-REFERENCES TO RELATED APPLICATIONS

The present application claims priority to Chinese Patent Application No. 201610151541.3 filed on Mar. 16, 2016, the disclosure of which is hereby incorporated by reference in its entirety.

FIELD

The present invention relates to the field of display technology, and particularly, to an array substrate, a display panel and a display device.

BACKGROUND

As an input and output device, touch display devices are one of the most simple and convenient human-machine interaction means. Therefore, touch display devices have been widely applied in various electronic products. The principle of detecting a touch point by a touch display device is detecting, based on different sensing means, changes of voltages, currents, acoustic waves or infrared rays when a finger or other objects substantially touches a display panel of the touch display device, resulting in detecting the coordinates of the touch point.

Touch display devices include In-Cell touch display devices in which sensing electrodes are directly embedded on an inner or outer side of a substrate in a liquid crystal display device, so that the devices are lighter and thinner.

FIG. 1 is a plan view schematically illustrating an existing In-Cell touch display device. As shown in FIG. 1, the touch display device includes a display area 11, which includes a plurality of pixel units 10 arranged in a matrix manner and touch signal lines Tx corresponding to the respective rows of pixel units 10. The touch display device further includes a bezel area 9, a portion of each touch signal line Tx is within the bezel area 9.

The inventors have found that the existing In-Cell touch display device has at least the following problem: as a portion of each touch signal line Tx is within the bezel area 9, a wiring space has to be reserved for the touch signal lines Tx in the bezel area 9 during design stage, resulting in that a width H1 of the bezel area 9 is relatively larger. Thus, it is difficult for the existing In-Cell touch display device to realize design of no-bezel or narrow bezel.

SUMMARY

In view of the problem that the width of the bezel area of the existing In-Cell touch display device is relatively larger, the present invention provides an array substrate, a touch panel and a display device.

An embodiment of the present invention provides an array substrate comprising a plurality of pixel units arranged in a matrix manner and a plurality of strip-shaped touch electrodes arranged between adjacent rows of pixel units, respectively, each touch electrode being connected with a corresponding one of a plurality of touch signal lines, at least part of the plurality of touch signal lines being arranged between adjacent columns of pixel units, respectively.

Optionally, each pixel unit comprises a common electrode, the common electrodes of the pixel units in a same row are connected with a touch electrode corresponding to the pixel units in the same row, and in a display period of one frame of image, the common electrode is loaded with a common voltage signal and a touch scanning signal in a time-shared manner.

Optionally, the touch signal lines and the touch electrodes are in a same layer, and if one of the touch signal lines intersects with one or more touch electrode not corresponding thereto, the one touch signal line is disconnected as two touch signal line portions respectively located at both sides of each intersection of the one touch signal line and each touch electrode not corresponding thereto, the two touch signal line portions are connected through a connection bridge, and an insulating layer is arranged between the connection bridge and the touch electrode in an overlapping area therebetween.

Optionally, the touch signal lines and the touch electrodes are in a same layer, and if one of the touch electrodes intersects with one or more touch signal line not corresponding thereto, the one touch electrode is disconnected as two touch electrode portions respectively located at both sides of each intersection of the one touch electrode and each touch signal line not corresponding thereto, the two touch electrode portions are connected through a connection bridge, and an insulating layer is arranged between the connection bridge and the touch signal line in an overlapping area therebetween.

An embodiment of the present invention further provides a touch panel comprising an array substrate described herein.

Optionally, the touch panel further comprises a plurality of strip-shaped sensing electrodes, a lengthwise direction of which being parallel to a column direction of the pixel units.

Optionally, the sensing electrodes are on the array substrate, and an insulating layer is provided between the sensing electrodes and the touch electrodes on the array substrate.

Optionally, the touch panel further comprises a color filter substrate facing the array substrate, and the sensing electrodes are on a side of the color filter substrate distal to the array substrate.

Optionally, an area between adjacent sensing electrodes is provided with a fill layer.

Optionally, a first polarizer is provided at a side of the color filter substrate distal to the array substrate, and the sensing electrodes are between the color filter substrate and the first polarizer.

Optionally, a second polarizer is provided at a side of the array substrate distal to the color filter substrate.

An embodiment of the present invention further provides a display device comprising a touch panel described herein.

In the array substrate of the present invention, at least part of the plurality of touch signal lines are arranged between adjacent columns of pixel units, respectively. In this way, when the array substrate is applied in a display device, there is no need for reserving a space in the bezel area of the display device to accommodate touch signal lines therein, or only a small space is required to be reserved, thus the display device can realize design of no-bezel or narrow bezel. The array substrate of the present invention is applicable to various display devices, and particularly applicable to In-Cell touch display devices.

DETAILED DESCRIPTION OF THE EMBODIMENTS

To make those skilled in the art better understand the technical solutions of the present invention, the present invention will be described below in detail in conjunction with the accompanying drawings and specific embodiments.

First Embodiment

The present embodiment provides an array substrate comprising a plurality of pixel units arranged in a matrix manner and a plurality of strip-shaped touch electrodes arranged between adjacent rows of pixel units, respectively, each touch electrode being connected with a corresponding one of a plurality of touch signal lines, at least part of the plurality of touch signal lines being arranged between adjacent columns of pixel units, respectively.

In the array substrate of the present embodiment, at least part of the plurality of touch signal lines are arranged between adjacent columns of pixel units, respectively. In this way, when the array substrate is applied in a display device, there is no need for reserving a space in the bezel area of the display device to accommodate touch signal lines therein, or only a small space is required to be reserved, thus the display device can realize design of no-bezel or narrow bezel.

The array substrate of the present embodiment is applicable to various display devices, and particularly applicable to In-Cell touch display devices.

Second Embodiment

Figure 2:
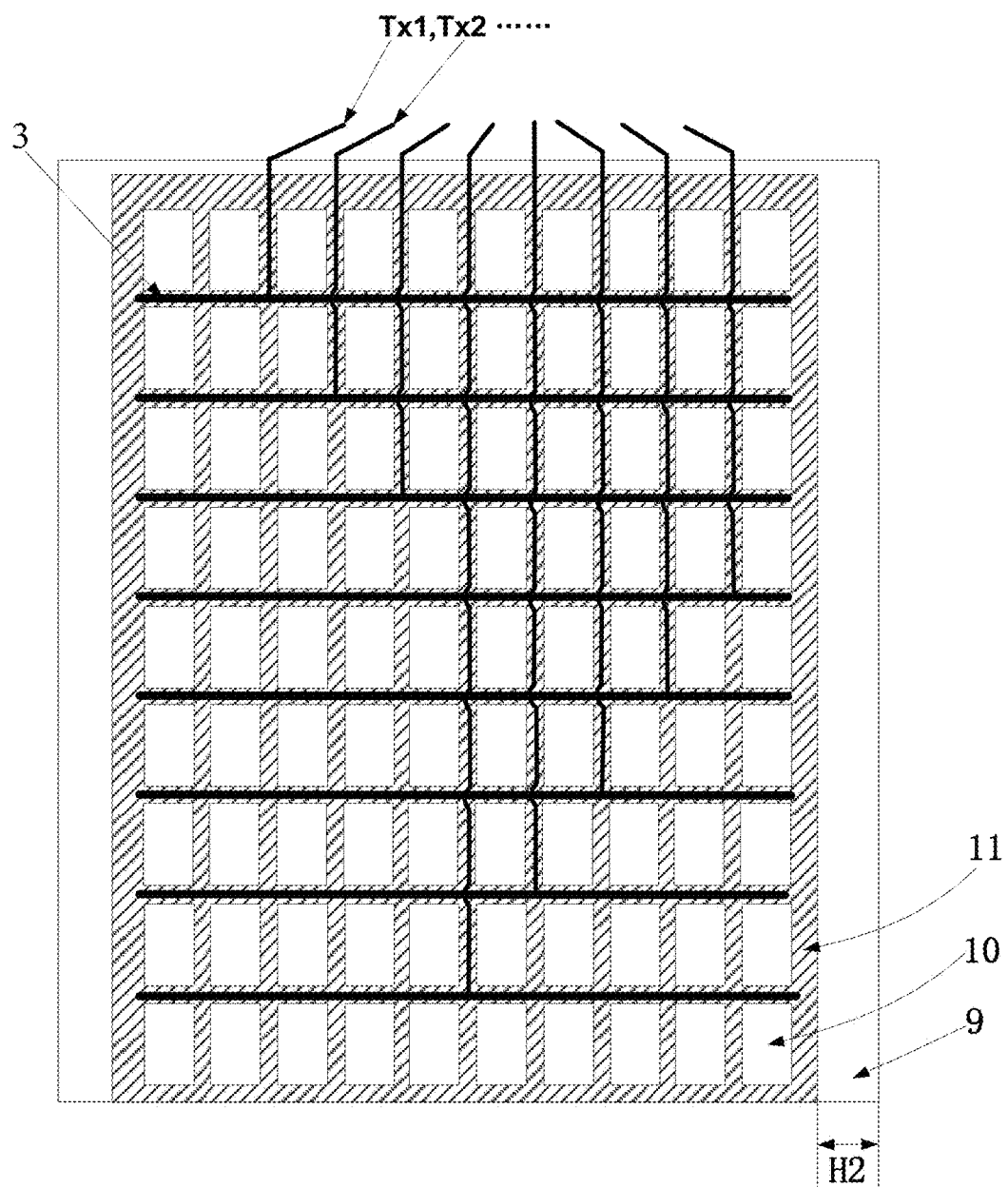
FIG. 2 is a plan view schematically illustrating an array substrate in a second embodiment of the present invention.
Figure 3:
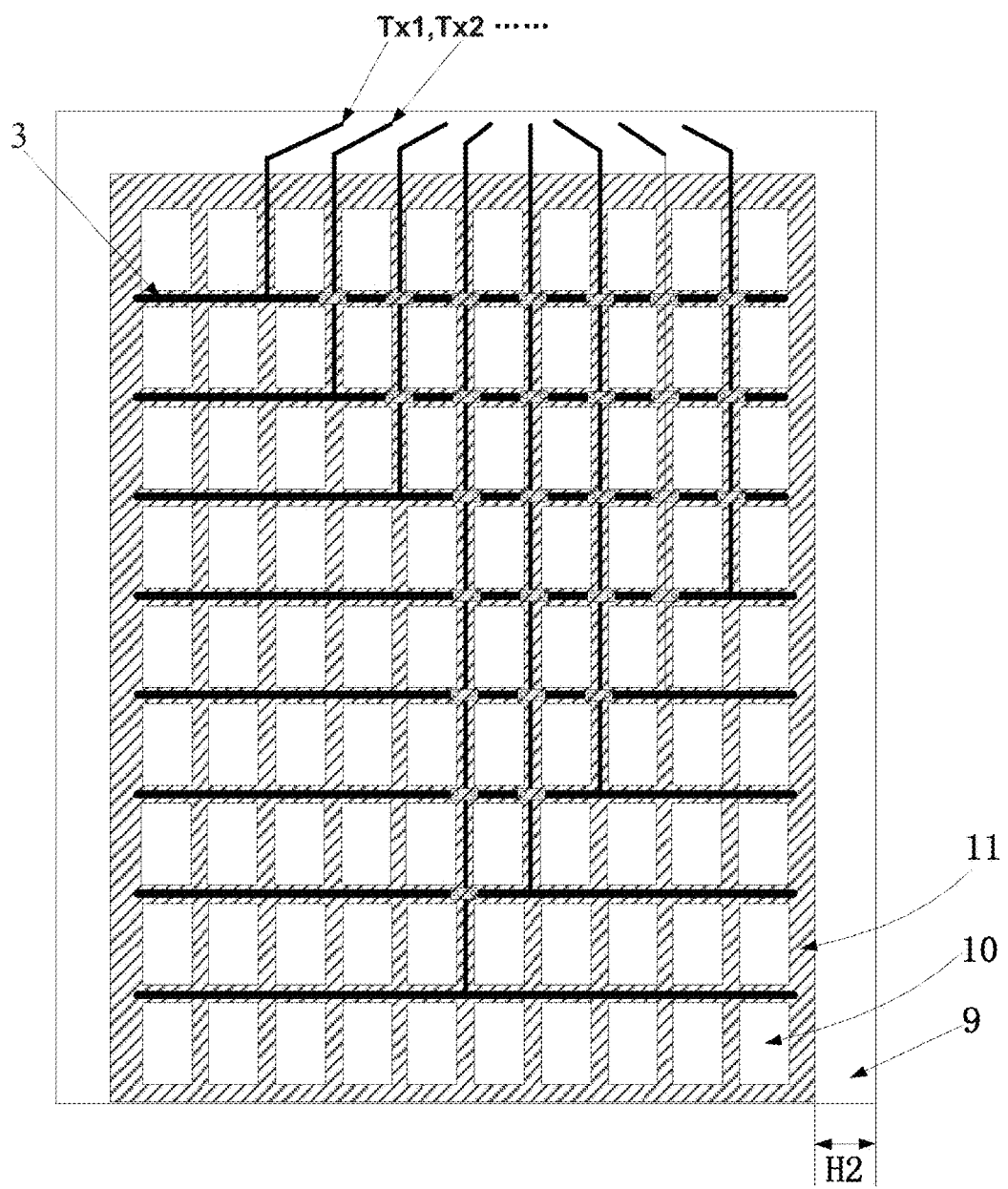
FIG. 3 is a plan view schematically illustrating an array substrate in the second embodiment of the present invention.

The present embodiment provides an array substrate, and FIG. 2 and FIG. 3 are plan views schematically illustrating the array substrate. As shown in FIG. 2 and FIG. 3, the array substrate comprises a plurality of pixel units 10 arranged in a matrix manner and a plurality of strip-shaped touch electrodes 3 arranged between adjacent rows of pixel units, respectively, i.e., a lengthwise direction of the touch electrode 3 is substantially parallel to the extending direction of a row of pixel units 10, each touch electrode 3 is connected with a corresponding one of a plurality of touch signal lines Tx (i.e., Tx1, Tx2, . . . ), at least part of the plurality of touch signal lines Tx are arranged between adjacent columns of pixel units 10, respectively.

Figure 1:
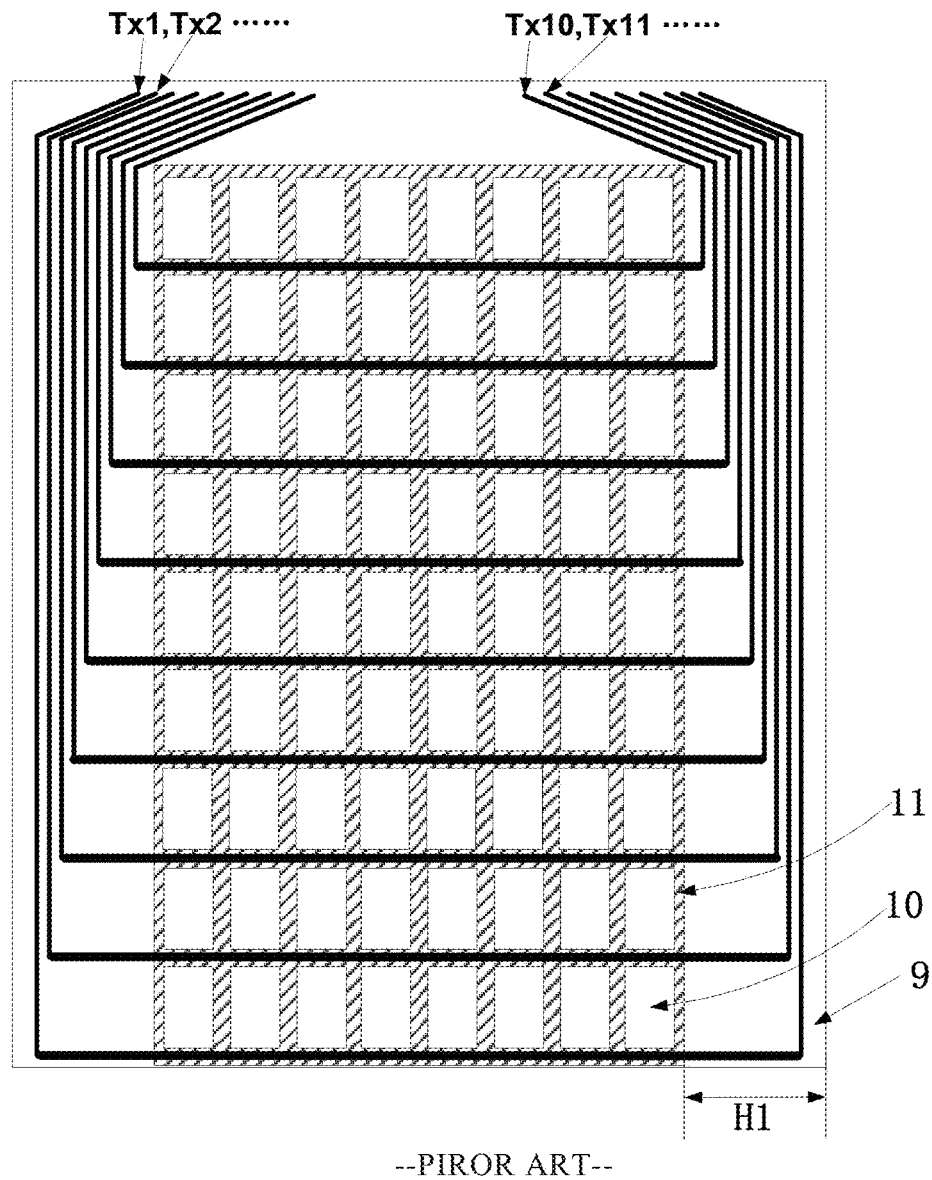
FIG. 1 is a plan view schematically illustrating an existing In-Cell touch display device.

From above it can be seen that, as at least part of the plurality of touch signal lines Tx are arranged between adjacent columns of pixel units 10, respectively, there is no need for reserving a space in the bezel area 9 to accommodate touch signal lines therein, or only a small space is required to be reserved, thus a display device comprising the present array substrate can realize design of no-bezel or narrow bezel, compared to the prior art. It can be seen from FIG. 2 and FIG. 3 that a width H2 of the bezel area 9 is narrower compared to the width H1 of the bezel area 9 in FIG. 1.

Optionally, each pixel unit 10 comprises a common electrode (not shown in the figures), the common electrodes of the pixel units 10 in a same row are connected with a touch electrode 3 corresponding to the pixel units 10 in the same row, and in a display period of one frame of image, the common electrode is loaded with a common voltage signal and a touch scanning signal in a time-shared manner. That is, the touch electrode 3 is connected with the common electrode of the pixel unit 10, and thus an area of the touch electrode 3 is increased accordingly, so that in the display period of one frame of image, the common electrode is capable of being loaded with the common voltage signal and the touch scanning signal in a time-shared manner.

As shown in FIG. 2, the touch signal lines Tx and the touch electrodes 3 are in a same layer, and if one of the touch signal lines Tx intersects with one or more touch electrode 3 not corresponding thereto, the one touch signal line Tx is disconnected as two touch signal line portions respectively located at both sides of each intersection of the one touch signal line and each touch electrode 3 not corresponding thereto, the two touch signal line portions are connected through a connection bridge, and an insulating layer is arranged between the connection bridge and the touch electrode 3 in an overlapping area therebetween.

Alternatively, as shown in FIG. 3, the touch signal lines Tx and the touch electrodes 3 are in a same layer, and if one of the touch electrodes 3 intersects with one or more touch signal line Tx not corresponding thereto, the one touch electrode 3 is disconnected as two touch electrode portions respectively located at both sides of each intersection of the one touch electrode 3 and each touch signal line Tx not corresponding thereto, the two touch electrode portions are connected through a connection bridge, and an insulating layer is arranged between the connection bridge and the touch signal line Tx in an overlapping area therebetween.

For example, as shown in FIG. 3, a touch signal line Tx1 is configured to provide signals to a first touch electrode 3 in a direction from top to bottom, and a touch signal line Tx2 is configured to provide signals to a second touch electrode 3 in the direction from top to bottom. Inevitably, the touch signal line Tx2 intersects with the first touch electrode 3 in the direction from top to bottom, and thus, this touch electrode 3 is disconnected as two portions at the intersection, and the two portions of this touch electrode 3 are connected through a connection bridge, so that the touch signal line Tx2 and the first touch electrode 3 in the direction from top to bottom will not interfere with each other.

Third Embodiment

The present embodiment provides a touch panel comprising the array substrate 1 provided in the second embodiment.

Figure 4:
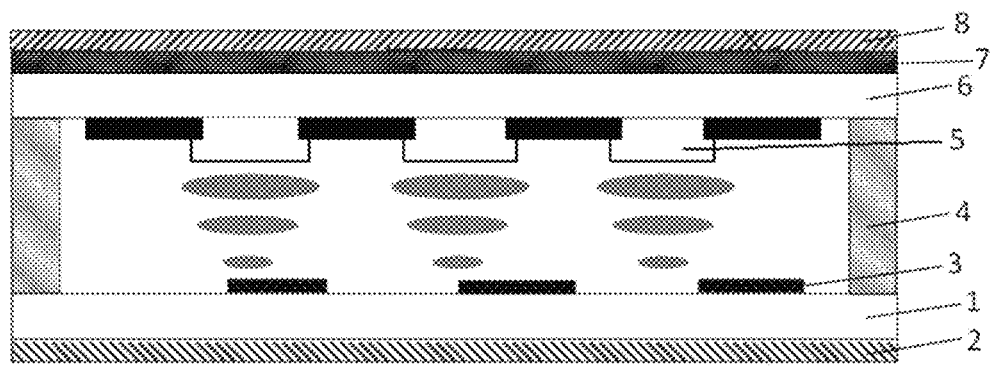
FIG. 4 is a sectional view of a touch panel in a third embodiment of the present invention.

FIG. 4 is a sectional view illustrating the touch panel. As shown in FIG. 4, the touch panel further comprises a color filter substrate 6. The array substrate 1 and the color filter substrate 6 face each other, and liquid crystal molecules are provided therebetween. A framing sealant 4 is provided between the array substrate 1 and the color filter substrate 6, and is used for sealing the array substrate 1 and the color filter substrate 6 to form a liquid crystal cell. The touch electrodes 3 are arranged on a side of the array substrate 1 facing the color filter substrate 6, and color filters 5 are arranged on a side of the color filter substrate 6 facing the array substrate 1. A first polarizer 8 is provided on a side of the color filter substrate 6 distal to the array substrate 1, and a second polarizer 2 is provided on a side of the array substrate 1 distal to the color filter substrate 6.

That is, a mutual capacitive touch panel is shown in FIG. 4, in which a plurality of strip-shaped touch electrodes 3 are arranged between adjacent rows of pixel units 10 in the array substrate 1, respectively, each touch electrode 3 is connected with a corresponding one of a plurality of touch signal lines Tx, at least part of the plurality of touch signal lines Tx are arranged between adjacent columns of pixel units 10 in the array substrate, respectively. In this way, there is no need for reserving a space in the bezel area 9 to accommodate touch signal lines therein, or only a small space is required to be reserved, thus the touch panel comprising the array substrate 1 can realize design of no-bezel or narrow bezel.

Optionally, the touch panel further comprises a plurality of strip-shaped sensing electrodes 7, a lengthwise direction of which is substantially parallel to a column direction of the pixel units 10. It should be noted that the plurality of strip-shaped sensing electrodes 7 are spaced apart and insulated from each other.

Optionally, the sensing electrodes 7 are arranged at a side of the color filter substrate 6 distal to the array substrate 1. As shown in FIG. 4, the sensing electrodes 7 and the first polarizer 8 are both arranged at the side of the color filter substrate 6 distal to the array substrate 1, and the sensing electrodes 7 are between the first polarizer 8 and the color filter substrate 6. Moreover, a lengthwise direction of the sensing electrode 7 is substantially parallel to the column direction of the pixel units 10, a lengthwise direction of the touch electrode 3 is substantially parallel to a row direction of the pixel units 10, and the lengthwise direction of the sensing electrode 7 is substantially perpendicular to the lengthwise direction of the touch electrode 3.

Optionally, an area between adjacent sensing electrodes 7 is provided with a fill layer 12.

Figure 5:
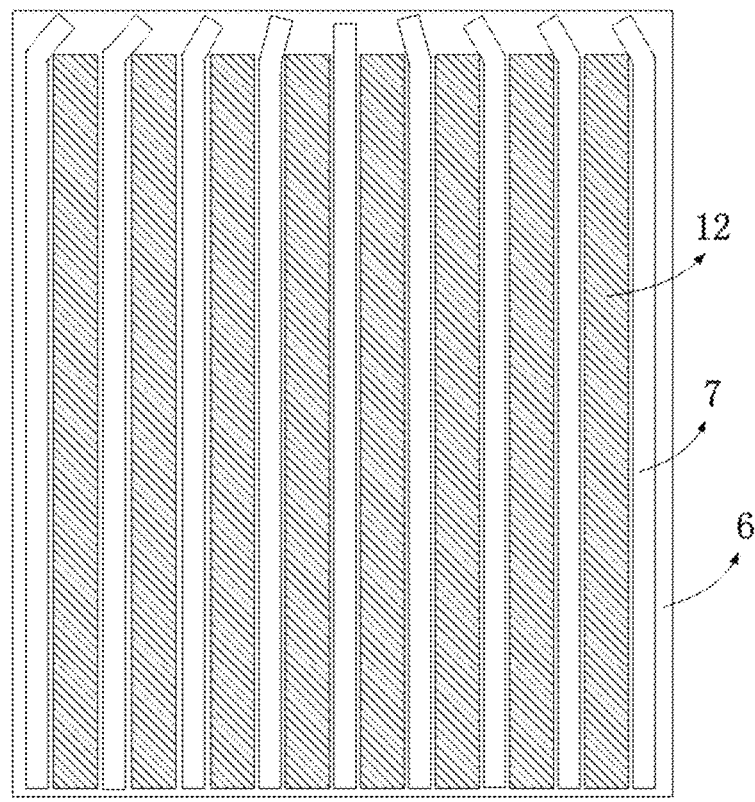
FIG. 5 is a partial view schematically illustrating a touch panel in the third embodiment of the present invention.

FIG. 5 is a partial view schematically illustrating the touch panel in the present embodiment. As shown in FIG. 5, the sensing electrodes 7 are of a strip shape and are spaced apart from each other, resulting in an uneven side of the color filter substrate 6 distal to the array substrate 1, which in turn results in an uneven surface of the whole touch panel. By providing the fill layer 12 within the area between adjacent sensing electrodes 7, the flatness of the surface of the whole touch panel can be ensured.

Alternatively, the sensing electrodes 7 may be provided on the array substrate, and an insulating layer (not shown in the figures) is provided between the touch electrodes 3 in the array substrate 1 and the sensing electrodes 7.

That is, the structure of FIG. 4 in which the sensing electrodes 7 is arranged on the color filter substrate 6 may be not employed in the present embodiment, and instead of that, a structure in which the sensing electrodes 7 and the touching electrodes 3 are both arranged on the array substrate 1 is employed, and the insulating layer is provided between the sensing electrodes 7 and the touch electrodes 3.

Certainly, specific implementations of the above embodiments can he modified in various ways. For example, there is no need for reserving a space in the bezel area 9 to accommodate touch signal lines Tx therein, or only a small space is required to be reserved, thus the display device can realize design of no-bezel or narrow bezel; in this case, the specific dimensions of the bezel area 9 can be designed in accordance with different products. Further, the connection mode at an intersection of a touch signal line Tx and a touch electrode 3 not corresponding thereto can utilize other connection manners such as crossing over.

Fourth Embodiment

The present embodiment provides a display device comprising the touch panel in the third embodiment. The display device may be any product or part having a display function such as a liquid crystal panel, an electronic paper, a mobile phone, a tablet computer, a television, a display, a laptop computer, a digital frame, a navigator and the like.

It could be understood that the above embodiments are merely exemplary embodiments adopted for describing the principle of the present invention, but the present invention is not limited thereto. Various variations and improvements may be made for those with ordinary skill in the art without departing from the spirit and essence of the present invention, and these variations and improvements shall also fall within the protection scope of the present invention.

What is claimed is:

1. An array substrate, comprising a plurality of pixel units arranged in a matrix manner and a plurality of strip-shaped touch electrodes arranged between adjacent rows of pixel units, respectively, each touch electrode being connected with a corresponding one of a plurality of touch signal lines, at least part of the plurality of touch signal lines being arranged between adjacent columns of pixel units, respectively, wherein the touch signal lines and the touch electrodes are in a same layer, and when one of the touch signal lines intersects with one more touch electrode not corresponding thereto, the one touch signal line is disconnected as two touch signal lines portions respectively located at both sides of each intersection of the one touch signal line and each touch electrode not corresponding thereto, the two touch signal line portions are connected through a connection bridge, and an insulating layer is arranged between the connection bridge and the touch electrode in an overlapping area therebetween.

2. The array substrate of claim 1, wherein each pixel unit comprises a common electrode, the common electrodes of the pixel units in a same row are connected with a touch electrode corresponding to the pixel units in the same row, and in a display period of one frame of image, the common electrode is loaded with a common voltage signal and a touch scanning signal in a time-shared manner.

3. An display panel comprising an array substrate, the array substrate comprising a plurality of pixel units arranged in a matrix manner and a plurality of strip-shaped touch electrodes arranged between adjacent rows of pixel units, respectively, each touch electrode being connected with a corresponding one of a plurality of touch signal lines, at least part of the plurality of touch signal lines being arranged between adjacent columns of pixel units, respectively, wherein the touch signal lines and the touch electrodes are in a same layer, and when one of the touch signal lines intersects with one more touch electrode not corresponding thereto, the one touch signal line is disconnected as two touch signal lines portions respectively located at both sides of each intersection of the one touch signal line and each touch electrode not corresponding thereto, the two touch signal line portions are connected through a connection bridge, and an insulating layer is arranged between the connection bridge and the touch electrode in an overlapping area therebetween.

4. The touch panel of claim 3, further comprising a plurality of strip-shaped sensing electrodes, a lengthwise direction of which being parallel to a column direction of the pixel units.

5. The touch panel of claim 4, wherein the sensing electrodes are on the array substrate, and an insulating layer is provided between the sensing electrodes and the touch electrodes on the array substrate.

6. The touch panel of claim 4, further comprising a color filter substrate facing the array substrate, and the sensing electrodes being on a side of the color filter substrate distal to the array substrate.

7. The touch panel of claim 6, wherein an area between adjacent sensing electrodes is provided with a fill layer.

8. The touch panel of claim 6, wherein a polarizer is provided at a side of the color filter substrate distal to the array substrate, and the sensing electrodes are between the color filter substrate and the polarizer.

9. The touch panel of claim 6, wherein a polarizer is provided at a side of the array substrate distal to the color filter substrate.

10. A display device comprising a touch panel, the touch panel comprising an array substrate, the array substrate comprising a plurality of pixel units arranged in a matrix manner and a plurality of strip-shaped touch electrodes arranged between adjacent rows of pixel units, respectively, each touch electrode being connected with a corresponding one of a plurality of touch signal lines, at least part of the plurality of touch signal lines being arranged between adjacent columns of pixel units, respectively, wherein the touch signal lines and the touch electrodes are in a same layer, and when one of the touch signal lines intersects with one more touch electrode not corresponding thereto, the one touch signal line is disconnected as two touch signal lines portions respectively located at both sides of each intersection of the one touch signal line and each touch electrode not corresponding thereto, the two touch signal line portions are connected through a connection bridge, and an insulating layer is arranged between the connection bridge and the touch electrode in an overlapping area therebetween.

11. The display device of claim 10, wherein the touch panel further comprises a plurality of strip-shaped sensing electrodes, a lengthwise direction of which being parallel to a column direction of the pixel units.

12. The display device of claim 11, wherein the sensing electrodes are on the array substrate, and an insulating layer is provided between the sensing electrodes and the touch electrodes on the array substrate.

13. The display device of claim 11, wherein the touch panel further comprises a color filter substrate facing the array substrate, and the sensing electrodes are on a side of the color filter substrate distal to the array substrate.

14. The display device of claim 13, wherein an area between adjacent sensing electrodes is provided with a fill layer.

15. The display device of claim 13, wherein a polarizer is provided at a side of the color filter substrate distal to the array substrate, and the sensing electrodes are between the color filter substrate and the polarizer.

16. The display device of claim 13, wherein a polarizer is provided at a side of the array substrate distal to the color filter substrate.

* * * * *